United States Patent [19]
Cole

[11] 3,837,601
[45] Sept. 24, 1974

[54] AERODYNAMIC SLOT CLOSING MECHANISM

[75] Inventor: James Byron Cole, Mercer Island, Wash.

[73] Assignee: The Boeing Company, Seattle, Wash.

[22] Filed: Mar. 9, 1973

[21] Appl. No.: 339,645

[52] U.S. Cl. ........................................... 244/42 DB
[51] Int. Cl. ........................................ B64c 21/04
[58] Field of Search ....................................... 244/42

[56] References Cited
UNITED STATES PATENTS

| | | | |
|---|---|---|---|
| 2,352,062 | 6/1944 | Zap | 244/42 DB |
| 2,549,045 | 4/1951 | Ashkenas | 244/42 CB |
| 3,126,173 | 3/1964 | Alvarez-Calderon | 244/42 DB |
| 3,128,966 | 4/1964 | Alvarez-Calderon | 244/42 CB |
| 3,259,341 | 7/1966 | Steidl | 244/42 CC |
| 3,583,660 | 6/1971 | Hurkamp et al. | 244/42 DA |

Primary Examiner—Duane A. Reger
Assistant Examiner—Jesus D. Sotelo
Attorney, Agent, or Firm—Christensen, O'Connor, Garrison & Havelka

[57] ABSTRACT

In present day aircraft, the wing normally has two or more airfoil segments chordwise thereof, and the segments are extendible and retractable in relation to one another so that the adjacent edges thereof open and close an aerodynamic slot therebetween. According to the invention, an auxiliary closure member is provided on the slot-defining edge portion of one of the segments, which is shiftable in relation to the segments when the slot is open, between a position in which the member closes the slot, and a position in which the slot is reopened. In the reopened position, the closure member fairs into the edge portion of the one segment, relatively peripherally of the slot, whereas in the closure position, the member fairs into a chordwise surface of the wing, relatively crosswise of the slot.

12 Claims, 5 Drawing Figures

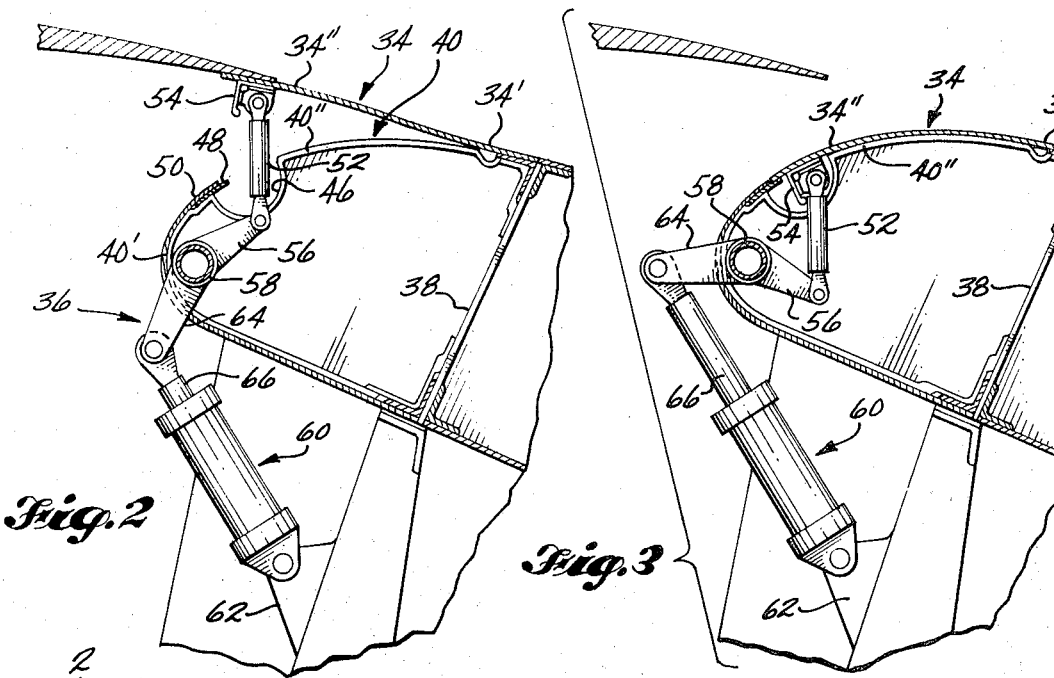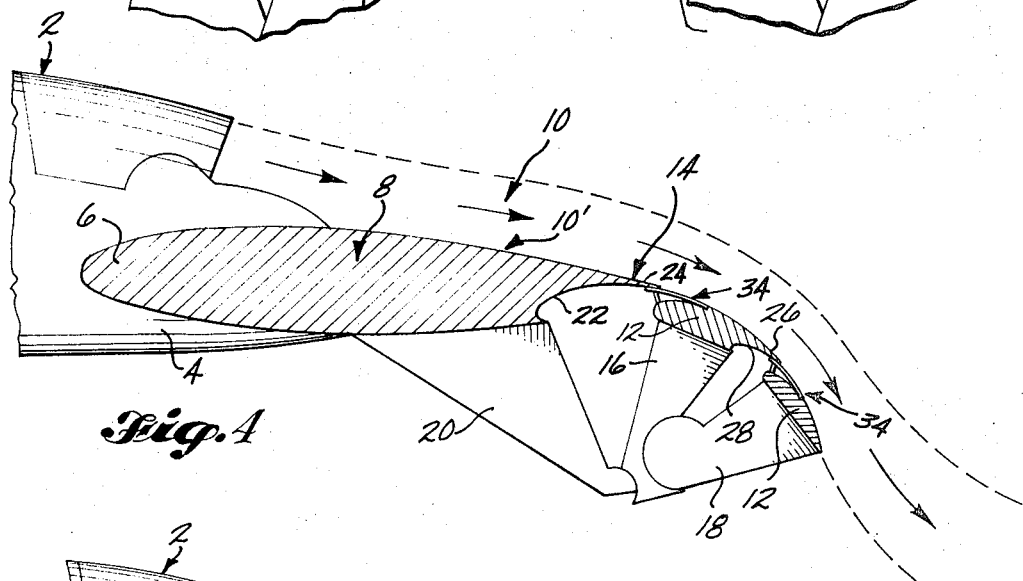

AERODYNAMIC SLOT CLOSING MECHANISM

THE INVENTION IN GENERAL

The invention provides a mechanism whereby a slotted airfoil structure such as a wing equipped with an extendible flap or flaps, may be converted from an open-slotted, extended-flap condition, to an extended-flap but closed-slotted condition, and vice versa. The invention also provides a mechanism of this nature which is simple in construction, inexpensive to include in the wing structure, and susceptible of long periods of service without undue maintenance. Furthermore, the invention provides a mechanism of this nature which is adapted to assure that the operative surfaces of the wing or other airfoil structure, are continuously uninterrupted and smoothly contoured in each condition of the structure. Other objects and advantages will become apparent from the description of the invention which follows.

BRIEF DESCRIPTION OF THE DRAWINGS

The invention and its many ramifications will be best understood by reference to the accompanying drawings which illustrate a presently preferred embodiment of the same.

In the drawings.

FIG. 2 is a more confined, larger scale, part cross-sectional view of two airfoil segments of te wing, when the trailing edge slot therebetween has been closed by the mechanism illustrated;

FIG. 3 is another such view of the segments when the trailing edge slot therebetween has been reopened;

FIG. 4 is a part cross-sectional, schematic view of the wing as a whole, illustrating the upper surface blowing effect generated by the engines when the trailing edge slots have been closed to the condition of FIG. 2; and FIG. 5 is another such view when the trailing edge slots have been reopened to the condition of FIG. 3.

DESCRIPTION OF THE PREFERRED EMBODIMENT

Figure 1:
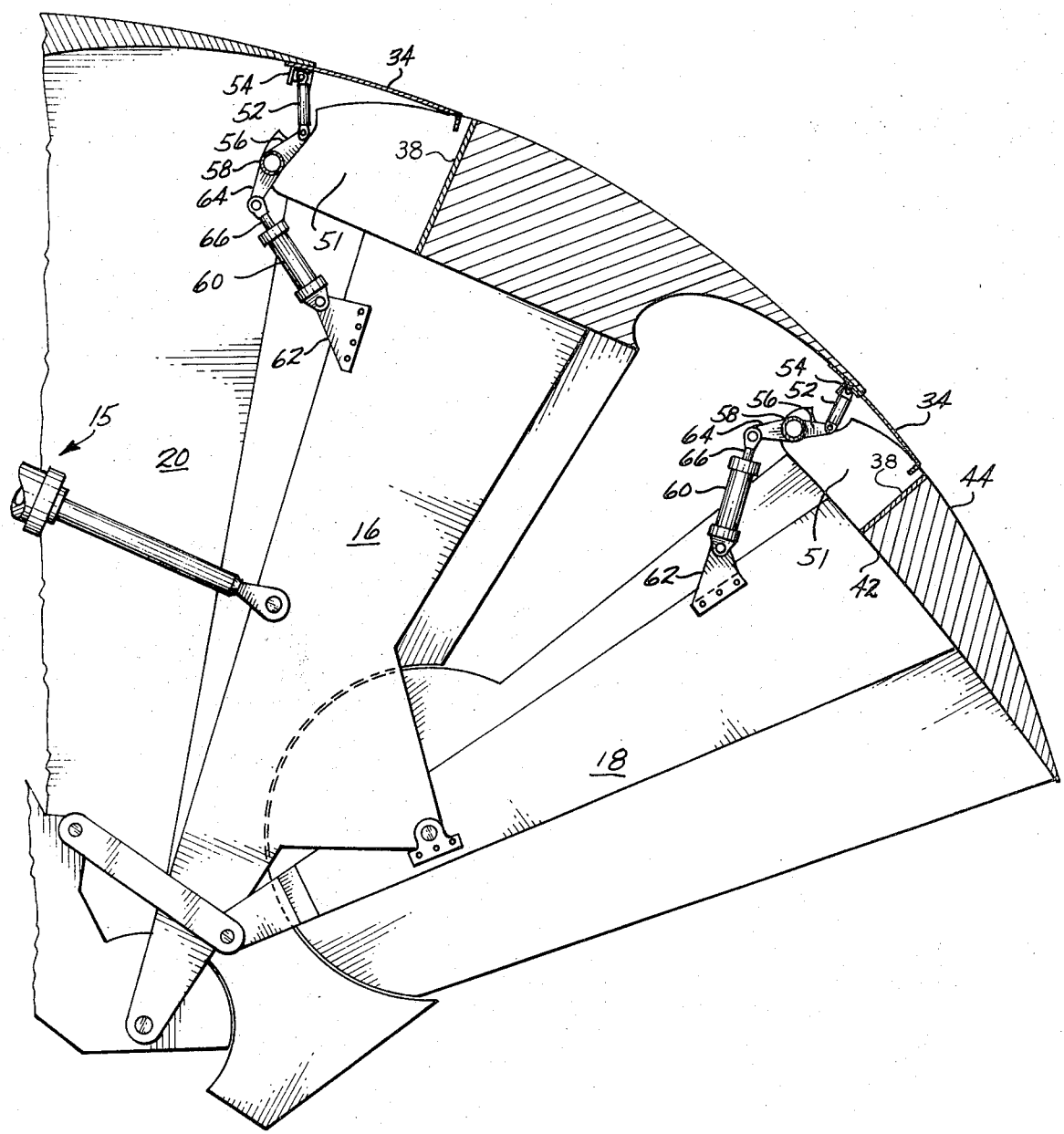
FIG. 1 is a part cross-sectional view illustrating the extended, trailing edge wing structure of a present day STOL type aircraft which is equipped with forwardly cantilevered upper surface blowing engines.

Referring to the drawings, it will be seen that each engine 2 of the aircraft is carried at the outboard end of a strut 4 which is forwardly cantilevered from the leading edge structure 6 of the main airfoil 8 of the wing 10. The strut 4 is also upwardly obliquely inclined to the wing, so that the engine is raised to a level slightly above the same to discharge chordwise over the upper surface 10' of the wing. The intent is to discharge the engine exhaust in such a way as to generate a blowing effect in which the upper surface airflow "sticks" to the wing as it travels thereover. Ideally, the effect is also applicable to a pair of flaps 12 which are mounted in tandem at the trailing edge 14 of the airfoil 8 on mutually pivotally interconnected, mechanically or hydraulically-driven (at 15) struts 16 and 18, the more forward 16 of which is pivotally mounted in turn on a fixed strut 20 slung from the underside of the airfoil 8. The latter strut 20 extends from the airfoil at a point well ahead of the trailing edge portion 14 of the same, and the underside of this portion has a recess 22 therein which effectively forms a rearwardly extending lip 24 along the upper trailing edge margin of the airfoil. The more forward flap 12 also has a similarly-formed lip 26 along the trailing edge margin thereof, and in the relatively retracted condition of the flaps, the more rearward flap 12 mates with the recess 28 in the more forward flap, while the latter mates in turn with the recess 22 in the airfoil 8. However, in the relatively extended condition of the flaps, they are spaced apart from one another, and from the airfoil, so that a slot 30 is formed between the pair of flaps, and another slot 32 is formed between the airfoil 8 and the more forward flap 12. In this condition, air is allowed to flow through the slots 30 and 32 as illustrated, so that each flap is effectively converted into a separate airfoil. Under most operational conditions, however, it is more desirable to close the slots, while the flaps remain extended; and accordingly, the invention provides a shiftable closure member 34 for each slot, as well as a mechanism 36 for controlling the movement of the member in a manner to be described.

Referring to FIGS. 1–3 in particular, it will be seen that each flap is reinforced by a bulkhead or spar 38 which extends spanwise of the flap and has a series of spaced ribs 40 on the forward face thereof, the profiles of which are convexly rounded and climb steeply from the underside 42 of the flap before they slope more gradually toward and into the overside 44 of the flap. Between the more steeply climbing 40' and more gradually sloping 40'' portions of the profiles, however, there are semi-circular grooves or recesses 46 which have outboard orientations toward the lip 24 or 26 ahead of them. The more steeply inclined portions 40' have a metal skin 50 thereover which extends upwardly from the bottom of the spar 38 and terminates at the mouths of the recesses 46, where the terminal edge of the same has a lip of additional skin 48 thereunder. The lip projects in part across the mouths of the recesses, along a contour line corresponding to that of the more gradually inclined portions 40'' of the rib profiles. The latter portions 40'' also have a skin thereover, although as seen, this is constituted by the closure member 34. The member 34 overlies the portions 40'', as well as the recesses 46, and overlaps the lip 48 so as to fair into the skin 50 and form a substantially continuously uninterrupted outer skin surface over the leading edge of the flap. However, the member 34 is anchored to the flap only along its trailing, upper spanwise edge 34' where it adjoins spar 38 and fairs into the overside 44 of the flap. Moreover, the member 34 is flexible in construction so that the main body 34'' of it can be bent to and from its relaxed, skin-tight position in FIG. 3, and an upwardly swung position illustrated in FIGS. 1 and 2. In this latter position, it engages the underside of the lip 24 or 26 of the flap or airfoil in front of it, and overlaps with the lip to substantially fair with the curvature of the lip as illustrated. Preferably, this faired condition is also augmented by streamlining the anchored, trailing edge portion 34' of the member into the overside of the flap as illustrated.

The mechanism 36 for shifting the member to and from the respective positions thereof can also be seen in FIGS. 1–3. The mechanism is housed in part in the space 51 (FIG. 1) between a pair of ribs 40, and includes a link 52 which acts effectively as a prop with which to raise and lower the member 34 between the positions thereof. The upper end of the line is pivotally interconnected with a rib or stringer 54 which runs spanwise of the leading or free end portion 34'' of the member; whereas the lower end of the link is pivotally interconnected with a crank arm 56 which is mounted in turn on a rotatable torque tube 58 that is housed inside of the flap and extends spanwise thereof. In practice, the torque tube 58 and the stringer 54 are interconnected by a plurality of such link and arm connections, although for purposes of the illustration, only one need be shown. The torque tube is controlled in turn by a hydraulic cylinder 60 which is pivotally interconnected at its lower end with an anchorage 62 on the adjoining strut 16 or 18, and pivotally interconnected at its upper end with a second crank arm 64 that is mounted crosswise from the first arm 56 on the torque tube. The disposition of the second arm 64 is such that when the piston 66 of the cylinder is extended in the manner of FIG. 3, it causes the tube to undergo counter-clockwise rotation, which in turn causes the first arm 56 to retract the link into the recess 46 of the flap. On the other hand, when the piston is retracted in the manner of FIG. 2, the tube is reversed in direction and the link is extended into the slot in the manner of FIG. 2 so as to engage the member with the underside of the lip.

I claim:

1. In an aircraft in which the wing has two airfoil segments chordwise thereof, the relatively forward of which segments is relatively stationary and carries an engine on the leading edge portion thereof which is mounted so that the exhaust from the engine is discharged chordwise over the upper surface of the wing and generates a blowing effect by which the upper surface airflow is caused to "stick" to the wing as it travels thereover, and the relatively aft of which segments is detachedly mated with the trailing edge portion of the relatively forward segment, to form a single continuously uninterrupted airfoil, but is shiftably mounted on the wing so as to be extendible and retractable in relation to the relatively forward segment, for purposes of opening and closing an aerodynamic slot between the adjacent trailing and leading edge portions of the segments, an auxiliary closure member on the leading edge portion of the aft segment; which is shiftable relatively away from the aft segment, when the aft segment is extended and the slot is open, to assume a position in which the member closes the slot adjacent the upper surface of the wing, relatively crosswise of the slot, and which is reversedly shiftable relatively toward the aft segment, while the aft segment remains extended, to assume a position in which the member reopens the slot and fairs into the leading edge portion of the aft segment, relatively peripherally of the slot, and dual positive displacement drive means on the wing operable independently of one another, on one hand, to extend and retract the aft segment in relation to the forward segment, and on the other hand, to shift the closure member to and from the respective positions thereof when the aft segment is extended and the slot is open.

2. The aircraft according to claim 1, wherein the drive means includes a prop member which is interconnected between the closure member and the aft segment to reciprocate between a relatively extended position in the slot and a relatively retracted position peripheral thereof.

3. The aircraft according to claim 2, wherein the prop member takes the form of a rigid link which is pivotally interconnected between the closure member and a crank arm which is rotatably mounted in the aft segment.

4. The aircraft according to claim 1, wherein the closure member is pivotally connected with the aft segment, and the drive means is operable to pivot the member to and from the respective positions thereof.

5. The aircraft according to claim 4, wherein the closure member is flexible in construction and pivots by undergoing bending in relation to its connection with the aft segment.

6. The aircraft according to claim 5, wherein the closure member is connected with the relatively aft segment at points adjacent the overside thereof, and undergoes bending to and from a relatively retracted position in which the member fairs into the leading edge portion of the aft segment relatively downward from said points.

7. The aircraft according to claim 6, wherein the drive means is housed in part in a recess in the leading edge portion of the aft segment, and the closure member is operable to cover the recess in the relatively retracted position thereof.

8. The aircraft according to claim 1, wherein the leading edge portion of the aft segment has a series of spaced ribs spanwise thereof, and the closure member constitutes a portion of the skin covering said ribs.

9. The aircraft according to claim 6, wherein the trailing edge portion of the forward segment has a recess in the underside thereof forming a rearwardly extending lip along the upper margin of the portion, with which the closure member engages in the slotclosure position thereof, and wherein the leading edge portion of the aft segment, including the closure member, mates with the recess in the relatively retracted condition of the aft segment.

10. The aircraft according to claim 9, wherein the lip and the closure member overlap in the engaged condition thereof.

11. The aircraft according to claim 1 wherein the aft segment is pivotal in relation to the forward segment.

12. The aircraft according to claim 1, wherein the closure member is pivotally connected to the aft segment, and the drive means includes a link which is pivotally interconnected between the closure member and a crank arm of a power-driven torque tube rotatably mounted in the aft segment.

* * * * *